E. JUNGHANNS.
DUMP CAR.
APPLICATION FILED AUG. 19, 1918.
1,297,356.
Patented Mar. 18, 1919.
5 SHEETS—SHEET 4.
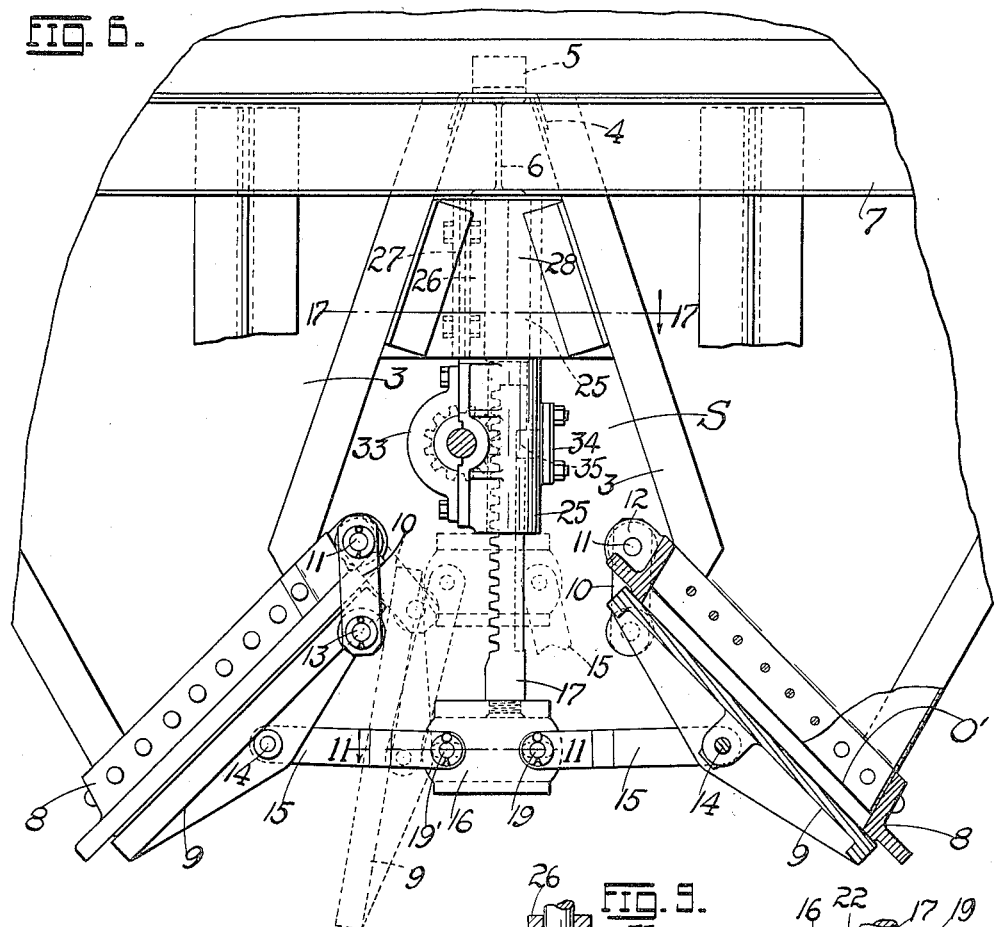
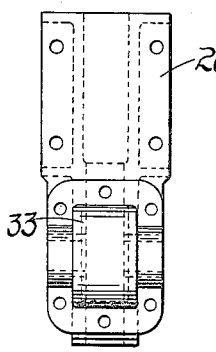
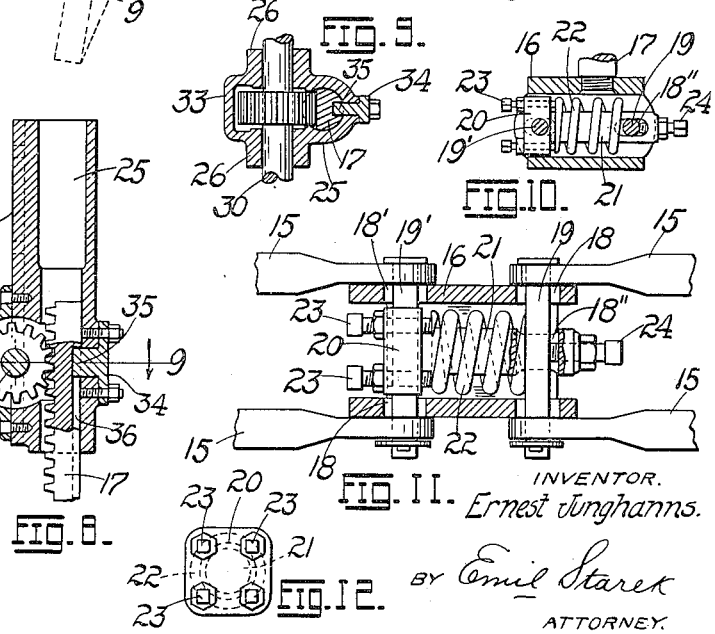
WITNESSES:
Harry A. Benner
Josam[?]
INVENTOR.
Ernest Junghanns.
BY Emil Starek
ATTORNEY.

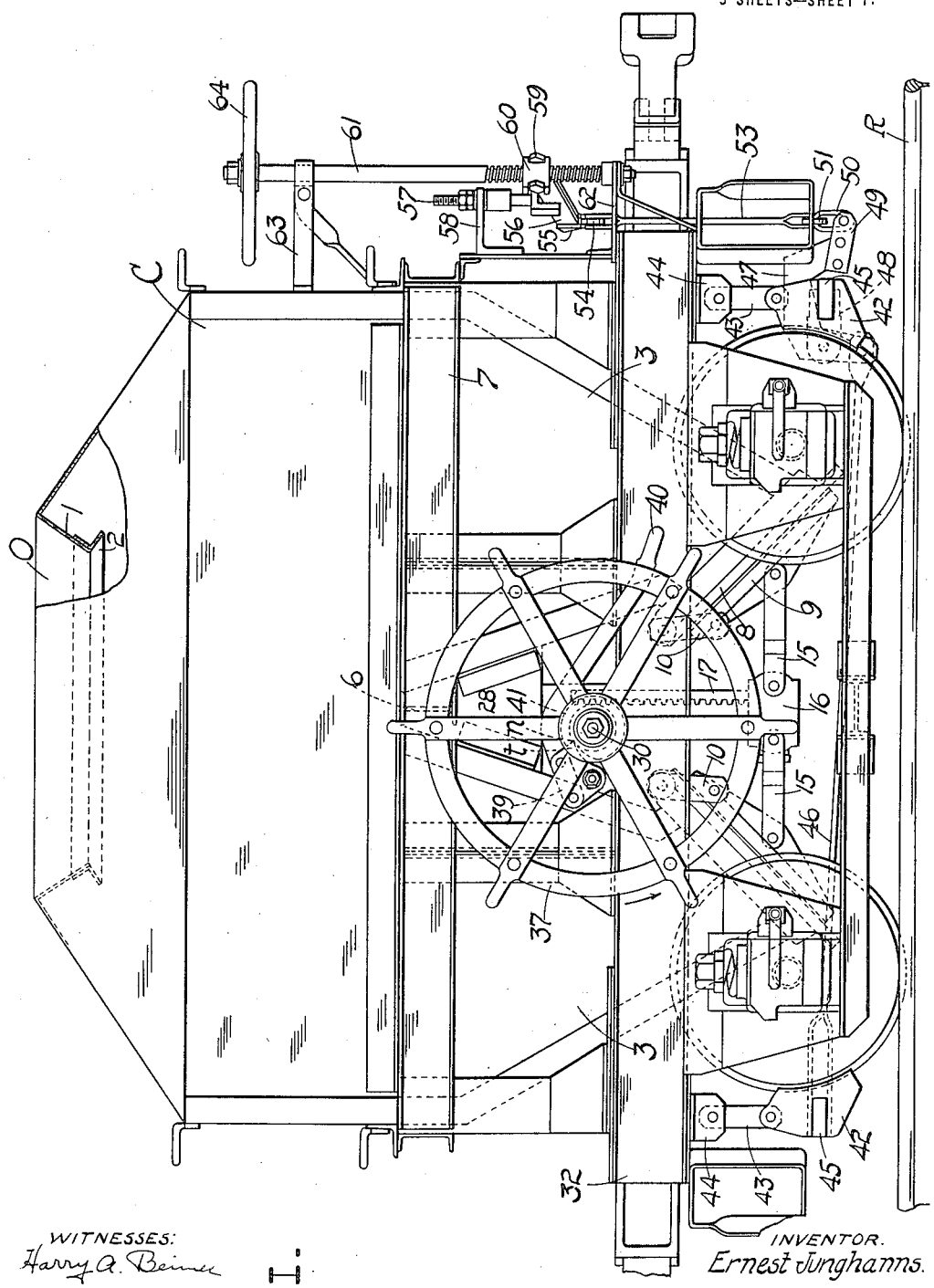

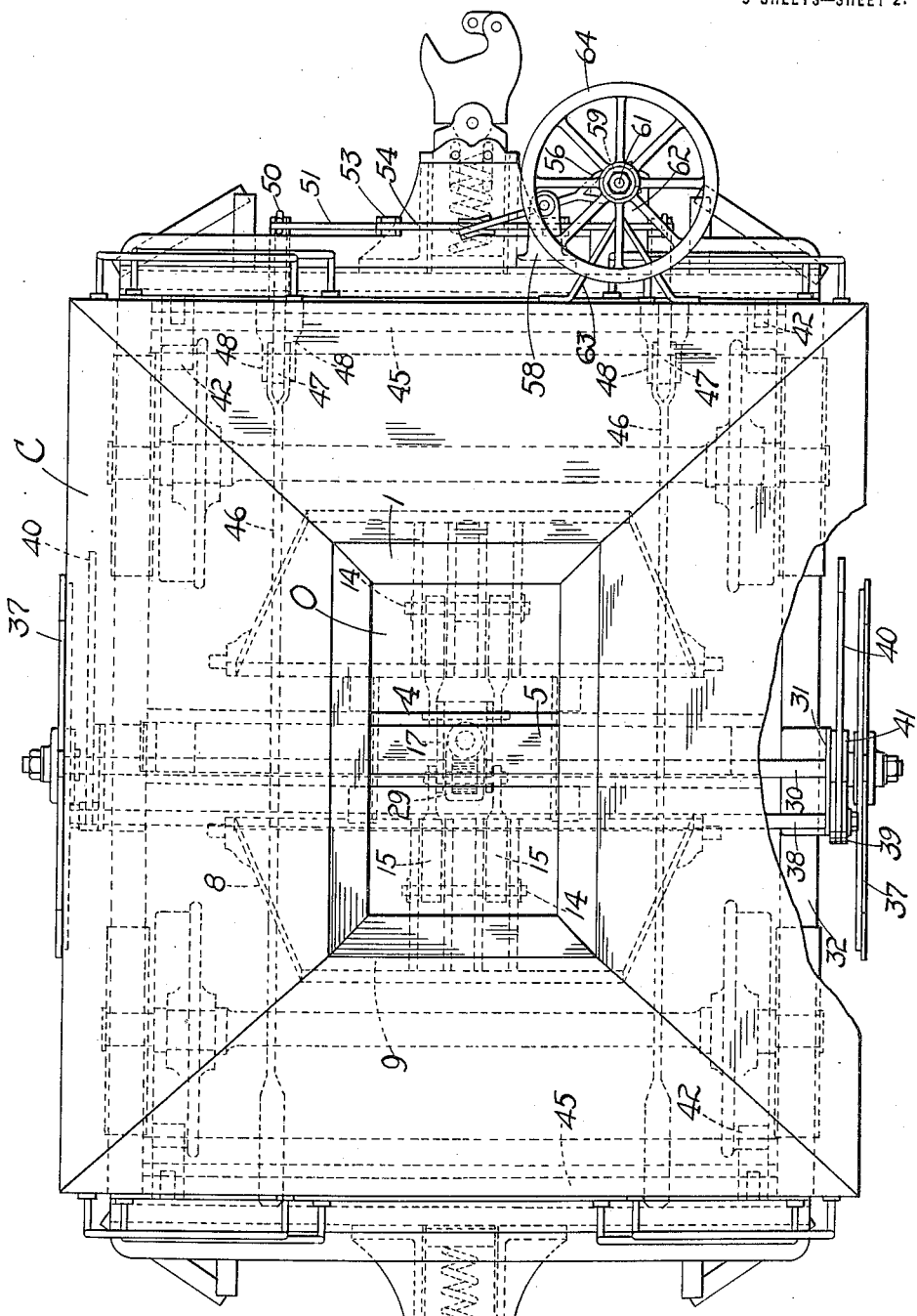

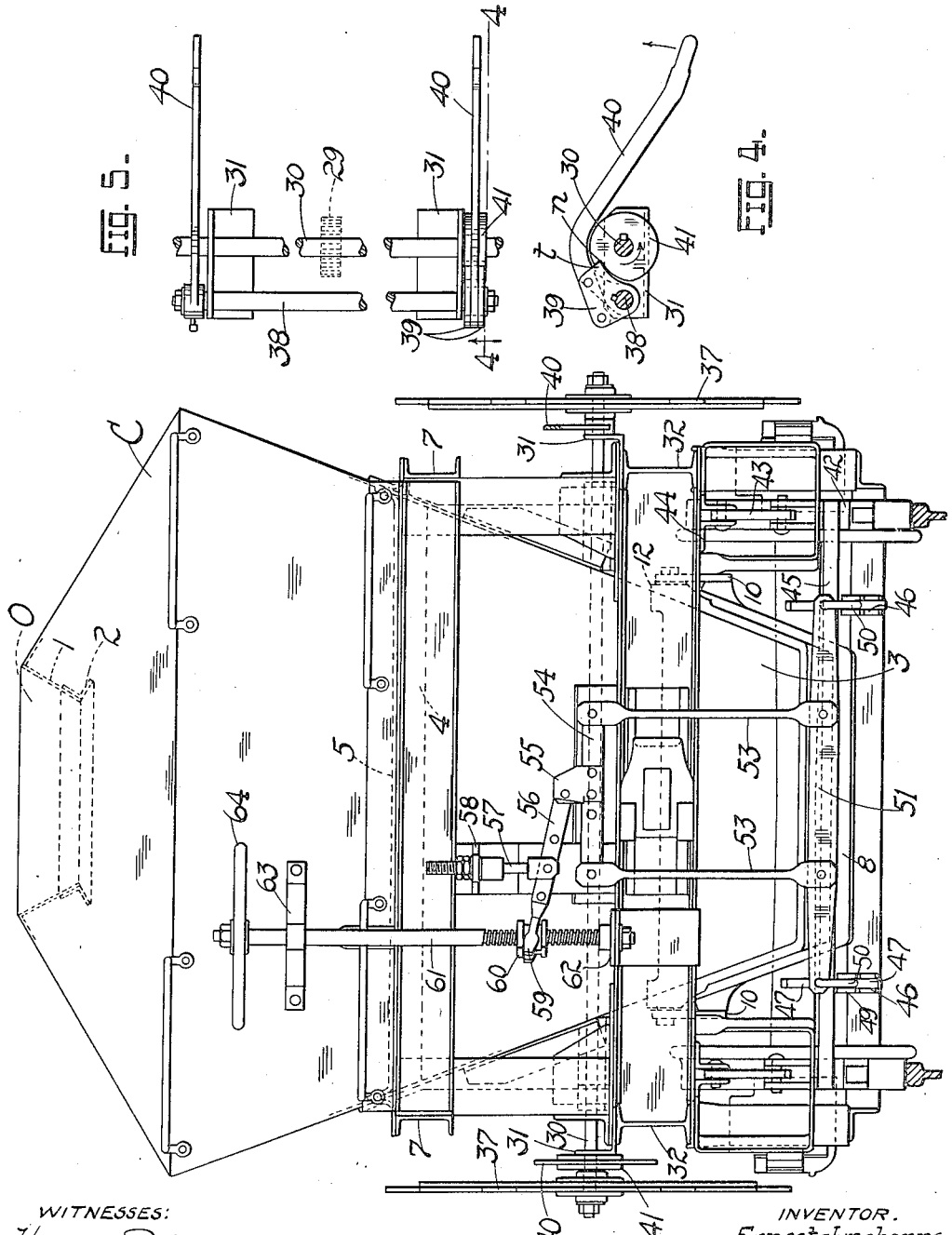

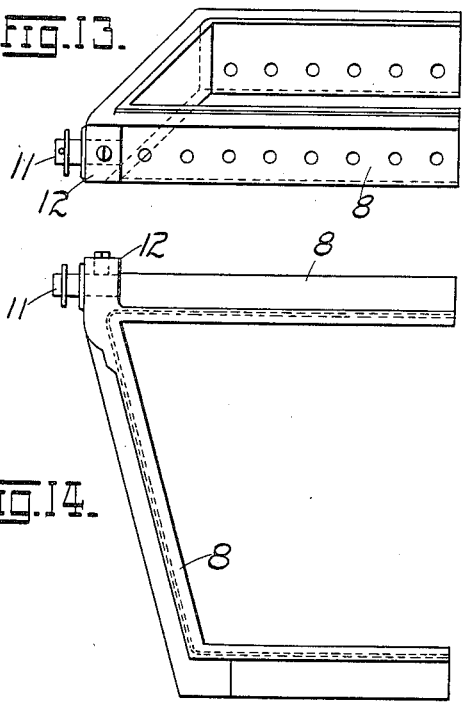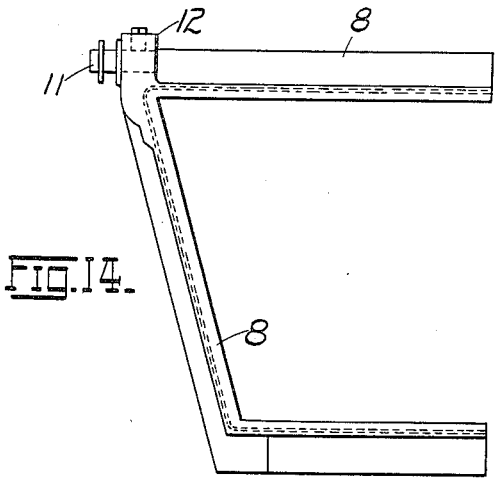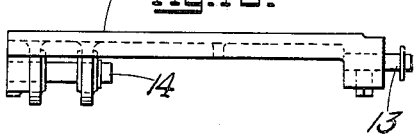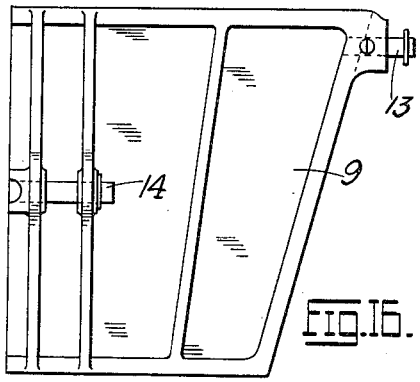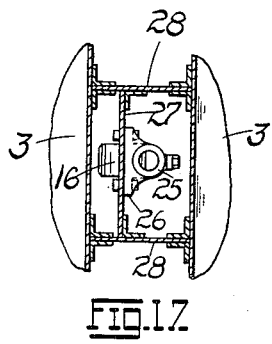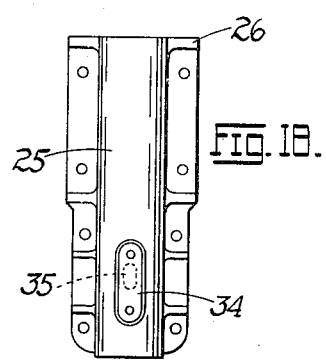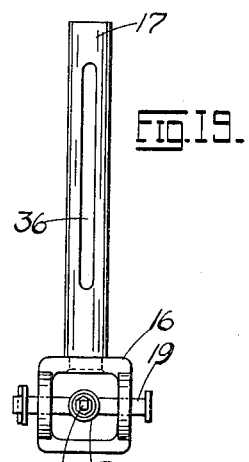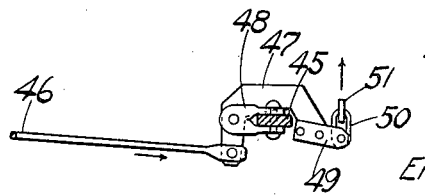

UNITED STATES PATENT OFFICE.

ERNEST JUNGHANNS, OF ANACONDA, MONTANA.

DUMP-CAR.

1,297,356. Specification of Letters Patent. Patented Mar. 18, 1919.

Application filed August 19, 1918. Serial No. 250,520.

*To all whom it may concern:*

Be it known that I, ERNEST JUNGHANNS, a citizen of the United States, residing at Anaconda, in the county of Deerlodge and State of Montana, have invented certain new and useful Improvements in Dump-Cars, of which the following is a full, clear, and exact description, reference being had to the accompanying drawings, forming a part hereof.

The present invention is directed to improvements in dump cars and particularly to those of the hopper-bottom type specially adapted for the handling of fine material or dust (as for example fine flue dust) having a tendency to pack, the object being to construct a car from which, material of the character referred to will discharge freely when released from the hopper, thereby leaving the walls of the hopper clean and without any material adhering thereto. In the present embodiment of my invention this result is attained by forming a hopper with walls inclined to the horizontal not less than fifty (50) degrees and mounting the charge-supporting dump doors in such a way that they will swing to substantially a vertical position to allow the material to discharge. A further object is to construct a car which shall be strong and compact, and so proportioned as to hold a maximum quantity and weight of material, the type shown in the drawings having a transporting capacity of four and one-half tons when loaded with Cottrell flue-dust, this material averaging about forty to fifty pounds to the cubic foot. A further object is to provide a car which will shed the material in cases of careless loading; one in which the material charged into the car is directed toward the center of the car to insure an equal distribution of the material to the (two) hoppers receiving the same; one in which the amount of dust raised during the loading operation is reduced to a minimum; one in which the dump doors sustaining the charge in the hoppers are flexibly suspended whereby they are free to aline themselves to the plane of contact with the faces of the door frames; one in which the dump doors may be forced to closed position with any desired degree of pressure; one in which the thrust against the doors of the respective hoppers is equalized; one in which the doors when once closed can not spring open with the jarring of the car in transport; one from which the discharge of the material is very rapid once the doors are opened sufficiently to release the contents of the hoppers; one in which the dump doors are under ready control of the operator; one in which the dump doors are wide and occupy a low position, thereby not only reducing the drop of the material discharged from the hoppers but releasing a maximum quantity at one time; and one possessing further and other advantages fully apparent from the following detailed description of the invention in connection with the accompanying drawings in which—

Figure 1 represents a side elevation of the improved car; Fig. 2 is a top plan thereof; Fig. 3 is a front end elevation showing part of the brake mechanism; Fig. 4 is a vertical cross-sectional detail on the line 4—4 of Fig. 5 showing the dump-shaft and lock-shaft parallel thereto, with the mechanism for locking the dump-shaft; Fig. 5 is a top plan of Fig. 4; Fig. 6 is an enlarged side elevation of the bottom of the car-body showing the oppositely disposed hoppers and the actuating mechanism for the hopper doors; Fig. 7 is a front face elevation of the casting forming the housing for the vertically reciprocating rack-bar by which the hopper doors are operated; Fig. 8 is a vertical middle section of the rack-bar housing taken through the pinion casing, the pinion and rack-bar being in elevation and the rack-bar partly in section to expose the groove in the rear face thereof; Fig. 9 is a cross-section on the line 9—9 of Fig. 8; Fig. 10 is a middle vertical longitudinal section of the push casting secured to the lower end of the rack-bar; Fig. 11 is an enlarged horizontal sectional detail through the push casting taken on the line 11—11 of Fig. 6; Fig. 12 is an end view of the adjustment piece looking toward the head or large end thereof; Fig. 13 is a rear elevation of one-half of the door frame; Fig. 14 is a plan of one-half of the door frame; Fig. 15 is a rear end view of one-half of the dump door; Fig. 16 is an outside plan view of one-half of the dump door; Fig. 17 is a horizontal sectional detail on the line 17—17 of Fig. 6 showing the manner of supporting the casting which houses and guides the rack-bar; Fig. 18 is a rear face elevation of the casting which houses the rack-bar; Fig. 19 is a rear elevation of the rack-bar with push casting attached; and Fig. 20 is a detail of the brake mechanism, the brake-beam being in cross-section.

Referring to the drawings, C, represents a car-body selected to obtain the steepest possible angles for a clean discharge. The top is made of four downwardly sloping, outwardly flaring walls to prevent accumulation of dust while charging. The charging opening 0 is rectangular in shape and is bounded by a throat 1 having its walls converging downwardly, the lower edges of the throat being reinforced by angles 2. The sloping walls of the throat 1 shed the material toward the center of the car and at the same time serve as baffles to prevent the escape of dust from the car during the loading. The car body is provided with bottom hoppers 3, 3, disposed on opposite sides of a central vertical transverse plane through the car body, all the walls of the hoppers being very steep, the side walls of the hoppers being continuous with the corresponding walls of the car body (Fig. 3), and the pitch of the several walls being not less than fifty degrees to the horizontal to insure a clean discharge. The hoppers are provided with bottom discharge openings 0' whose edges are disposed in planes inclining upwardly toward the central vertical transverse plane aforesaid, and being substantially perpendicular to one another and intersecting in said vertical plane. The inner inclined walls of the respective hoppers converge toward one another, terminating at the top at a point a short distance above the bottoms of the vertical end walls of the car body (Fig. 1), the upper edges of said walls being connected by a bridge piece or plate 4 which closes the gap between them and forms the ridge between the two hoppers, a bent reinforcing strip 5 being in turn disposed on top of the member 4, the bent ends of the strip being secured to the opposite inclined walls of the car-body. The bridge piece 4 is secured to the structural member or I-beam 6 confined between the outside channels 7. These structural details may of course be changed and are well within the purview of the skilled mechanic.

The discharge mouth or opening 0' of each hopper 3 is reinforced by a door-frame 8 against whose outer face is adapted to close the dump door 9, said door being hinged to the lower ends of the links 10 freely suspended from the studs 11 carried by the ears 12 on the frame, the door being likewise provided with studs 13 for receiving the links. The inner edge of the face of the frame 8 against which the door 9 closes may be considered as the edge of the discharge opening of the hopper since the material from the hopper must pass said edge before it can bear against the door. The outer faces of the doors are ribbed or otherwise strengthened, the ribs in the present instance serving to support the hinge pins 14 to which are pivotally secured the outer ends of the toggle links 15 leading from the central push casting 16. The push casting is a chambered member with flat top and bottom and side walls, and open at the ends. The top wall is secured to a vertically reciprocating rack-bar 17 the operating mechanism for which will be presently described. Disposed at opposite ends of the side walls of the push casting are longitudinally or horizontally elongated slots 18, 18', disposed in pairs, the slots 18 being traversed by the outer portions of a hinge pin 19, whereas the slots 18' are traversed by the outer portions of a parallel hinge pin 19', the projecting ends of the respective pins being pivotally coupled to the inner ends of the toggle links 15 leading from the outer hinge pins 14. The pin 19' is fixed to the head 20 of the adjustment piece, the stem 21 of which terminates beyond the pin 19, being provided with an elongated slot 18'' for the passage of the pin 19 therethrough, said slot being in alinement with the slots 18 (of the push casting) likewise traversed by said pin. Encircling the stem 21 of the adjustment piece is a compression spring 22 whose tension may be regulated by the set screws 23 disposed in a circle on the head 20, the free end of the stem 21 being likewise provided with a set screw 24 for adjusting the distance between the centers of the pins 19, 19', this adjustment being necessary in order to take up any wear in the holes of the toggle links by increasing the distance between the toggle pins (hinge pins) in the center push casting. The spring tension has to be reset with any variation of the distance between the center toggle pins, a tightening of the tension set screws having the effect of increasing the force with which the toggle links will press together the contact surfaces of the dump doors and the door frames. The slotting of the holes in the push casting is to allow for the equalizing of the thrust in the event of uneven wear of the toggle members or links and also to permit the setting of the center toggle pins 19, 19', at different distances for readjustment conditions. The object of hinging the doors to freely suspended links as shown, is to effect a flexible suspension for the doors so that when forced to a closed position by the toggles the doors may freely aline themselves to the machined contact faces of the door frames against which they bear.

The rack-bar 17 is disposed substantially on the center vertical axis of the car and is mounted to operate in the space S between the converging walls of the oppositely disposed hoppers 3, the said rack-bar being properly guided in its reciprocations by the tubular portion or housing 25 of the casting or plate 26 secured between the hoppers in said space S. The manner of fastening the casting or plate 26 is immaterial, but preferably the same is secured or bolted to a transverse plate 27 which is confined between the longitudinally disposed plates 28, 28, connecting the upper portions of the converging hopper walls (Figs. 6 and 17). The front wall of the rack-guide has a portion removed for the accommodation of a pinion 29 secured to the transversely disposed dump-shaft 30 mounted on the angle brackets 31 (Figs. 2 and 3) leading from the structural members 32. The pinion is protected by a cover plate 33 secured to the casting 26, the teeth of the pinion meshing with the rack bar substantially on the central vertical transverse plane through the car-body. Opposite the pinion 29 the rack-bar housing is provided with a plate 34 with which is formed or to which is secured, a stop piece or finger 35 which operates in a longitudinally disposed groove or notch 36 formed in the rear face of the rack-bar, the groove being of such length as to permit the stop-piece to arrest the rack-bar in its downstroke when the inner ends of the toggle links or the ends coupled to the pins 19, 19′, have dropped slightly past the straight line of the toggles, that is to say when the inner ends of the toggles have dropped below the outer ends or the ends secured to the dump doors. In practice the drop of the inner ends of the toggles is sufficient if the center lines of the pins 19, 19′, are depressed about one-eighth ($\frac{1}{8}$) of an inch below the center lines of the pins 14. This slight drop is shown somewhat exaggerated in Fig. 6 where the toggle links 15 incline downwardly somewhat toward the push casting 16. When the links have reached this position the doors 9 are fully closed, the tension spring 22 on the stem 21 of the adjustment piece exerting its full force between the inner or center toggle pins (19, 19′), and acting through said pins and toggle links against the doors. The dump-shaft 30 carrying the pinion 29 is operated from the spoke-wheels 37 keyed to the opposite ends of the shaft. Any equivalent of the spoke wheel may of course be employed, the substitution of such equivalent falling within the purview of the skilled mechanic.

Once the doors 9 are firmly locked, and the rack-bar has reached its lowest position by the stop-piece 35 striking the upper end of the groove 36, suitable provision must be made for locking the rack-bar against an accidental upward movement to prevent accidental lifting of the toggle links and a consequent opening of the dump doors. This is accomplished by locking the dump-shaft against a rotation tending to lift the rack-bar. In the present embodiment of my invention I dispose adjacent and parallel to the dump-shaft, a rock-shaft 38 serving as a lock-shaft, said lock-shaft being likewise mounted in the brackets 31 (Fig. 5). At one end of the lock-shaft is keyed a bifurcated dog 39 between whose sides there is keyed to the shaft a bent lever 40, a similar lever 40 being keyed to the opposite end of the shaft. The lock-shaft may thus be rocked by seizing the lever at either end thereof. In the path of sweep of the dog 39 there is keyed to the dump-shaft 30 a notched locking disk 41, the nose $t$ of the dog being adapted to drop into the notch $n$ formed on the disk and thereby preventing the disk and consequently the shaft 30 with its pinion 29 from rotating in a direction (counter-clockwise Fig. 4) to lift the rack-bar. It follows therefore that as long as the dog remains in engagement with the locking disk, the rack-bar by which the toggle members are forced against the doors, is locked against movement in both directions, downward by the stop-piece 35, and upward by the dog and locking disk. This makes it impossible for the toggles to "break" or open as a result of violent jerks or bumps in transport. To dump or discharge the contents of the car, the operator first raises up the safety-dog lever 40 which upon swinging through an arc of about ninety (90) degrees stands up leaning slightly past its center of gravity. Thereupon the operator seizes one of the spoke wheels 37 with his hands, turning the same in the direction indicated by the arrow in Fig. 1, thereby turning the dump-shaft in the same direction and releasing the toggle pressure and allowing the doors to drop. As soon as the toggle pins on the center push casting are raised slightly above the straight locking line of the toggles, the material pressing against the doors assisted by the weight of the doors, causes the latter to open automatically. The doors thus drop, causing the center push casting and its rack-bar to move upward (setting up a corresponding rotation in the dump-shaft 30 of course), the dump doors and toggles both assuming an almost vertical position (see dotted illustration Fig. 6), the free edges of the doors clearing the rails R by about three inches. The discharge of the material is clean and rapid, due not only to the extremely large openings of the door frames, but to the steep pitch of the hopper walls from which the material readily slides down. To close the dump doors the operator first depresses the safety lock lever 40, then turns the spoke wheel 37 in the opposite direction so as to depress the rack-bar, the rotation being continued until the toggle links have passed their straight horizontal locking line by which time the nose of the dog has dropped into the notch of the locking disk and the stop-piece 35 has reached the upper terminal of the groove 36, thus returning the several parts to their original positions. The car is then ready to be again loaded.

Owing to the wide dump doors and the low position of the same, the brake rigging must necessarily be modified to meet the new conditions. In the present embodiment of my invention the brake shoes 42 are hinged to the lower ends of suitable links 43 pivotally suspended from the brackets 44 secured to the I-beams 32, each pair of shoes being connected by a floating brake beam 45. In the present embodiment of my invention the brake-beams are connected by connecting rods 46 disposed outside of the path of sweep of the side edges of the doors, the said rods at the rear ends being coupled directly to the brake-beam, the front ends of the rods being pivotally secured to the adjacent arms of the bent levers 47 fulcrumed to the brackets 48 carried by the front brake-beams (Fig. 20). The outer arms of the levers 47 are provided with brackets or plates 49 to which are pivotally secured the links 50, the latter being in turn hinged to the outer terminals of the bottom floating beam 51. The beam 51 is connected by a pair of rods 53 to the ends of an upper equalizing lever 54 provided with a central bracket 55 to which is pivotally secured the adjacent arm of a vertically oscillating lever 56 fulcrumed at the middle to the lower end of a vertically adjustable stem 57 secured to a bracket 58 on the car-body, the opposite arm of the lever terminating in a fork 59 embracing a specially shaped nut 60 which traverses the threaded portion of a spindle 61 carried by the brackets 62 and 63 and terminating in a hand-wheel 64. To apply the brakes the operator rotates the spindle 61 in proper direction to depress the nut 60, thereby depressing the adjacent arm of the lever 56, the opposite end being raised. This raises the lever 54 and beam 51 thus oscillating upwardly the outer arms of the bent levers 47. The immediate effect of this is to pull on the rods 46 thus setting the rear brake-shoes. Further oscillation of the levers 47 (which, after the rear brakes are set oscillate about their pivotal connections with the rods 46 as fulcrums) has the effect of forcing the front brake-beams rearwardly, thereby applying the brakes to the front wheels. The details of the brake mechanism may of course be changed in many particulars without a departure from the spirit of my invention. Features shown in the drawings but not alluded to are either well known or constitute distinct improvements not herein claimed.

Having described my invention what I claim is:

1. In a dump-car, a car-body provided with a bottom-discharge hopper, the bounding edge of the discharge opening thereof being inclined to a given plane, a reciprocating member operating parallel to said plane opposite the discharge opening, a hinged dump-door for closing said opening, a connecting link hinged respectively to the door and to the reciprocating member, and a resilient member coöperating with the link to establish a yielding connection between door and reciprocating member.

2. In a dump car, a car-body provided with two bottom-discharge hoppers disposed on opposite sides of a vertical plane through the body, the discharge openings of the hoppers facing said plane and with the edges of the openings disposed in intersecting planes inclined upwardly toward said vertical plane, a vertically reciprocating member mounted to operate along said vertical plane opposite the discharge openings, dump-doors hinged in proximity to the discharge openings for closing said openings, toggle links disposed opposite one another and connecting the reciprocating member with the respective doors, and a resilient member coöperating with the links to permit the latter to swing past the straight line of the links in either direction.

3. In a dump-car, a car-body provided with a bottom-discharge hopper, the bounding edge of the discharge opening thereof being inclined to a vertical plane, a vertically reciprocating member operating opposite the discharge opening, a flexibly suspended hinged dump-door for closing said opening, a connecting link hinged respectively to the door and to the reciprocating member, and a spring on the reciprocating member coöperating with the link to establish a yielding connection between said member and door.

4. In a dump-car, a car-body provided with two bottom-discharge hoppers disposed on opposite sides of a vertical plane through the body, the discharge openings of the hoppers facing said plane and with the edges of the openings disposed in planes inclined upwardly toward and intersecting in said vertical plane, a vertically reciprocating member mounted to operate along said vertical plane between the hopper openings, dump-doors hinged to normally close the hopper openings, toggle links hinged at their outer ends to the doors, yielding connections between the inner ends of the links and said reciprocating member, and means for actuating said reciprocating member.

5. In a dump-car, a car body provided with two bottom hoppers disposed on opposite sides of a central vertical plane through the body, the discharge openings of the hoppers facing said plane and having their edges in planes disposed substantially at right angles to one another and inclined upwardly toward, and intersecting in said vertical plane, hinged dump doors normally closing the discharge openings of the hoppers and free to swing toward the central vertical plane with an opening movement of the doors, a vertically reciprocating member mounted along the central plane aforesaid, toggle links hinged at their outer ends to the doors, yielding connections between the inner ends of the links and said reciprocating member, and means for actuating said reciprocating member.

6. In a dump-car, a car-body provided with two bottom hoppers disposed on opposite sides of a central vertical plane through the body, the discharge openings of the hoppers facing said plane, the edges of the openings lying in planes disposed substantially at right angles to one another and inclined upwardly toward, and intersecting in, said vertical plane, hinged dump doors normally closing the discharge openings of the hoppers and free to swing toward the central vertical plane with an opening movement of the doors, a vertically reciprocating member mounted between the hoppers below the intersection of the inclined planes of the edges of the discharge openings, toggle links leading from the doors and yieldingly coupled to the reciprocating member to permit the axes of the links to assume a slight inclination to the straight locking line of the links for a closed position of the doors, means for arresting the reciprocating member against further movement in a given direction after the doors are fully closed, means for locking the reciprocating member against movement in the opposite direction, and means for actuating said member when released from the locking means.

7. In a dump-car, a car-body provided with two bottom hoppers disposed on opposite sides of a central vertical plane through the body, the discharge openings of the hoppers facing said plane and having their edges disposed in intersecting planes inclined upwardly toward said vertical plane, flexibly suspended hinged dump doors controlling the discharge openings of the hoppers, a vertically reciprocating member between the hinge axes of the doors, and links pivotally connecting said member with the doors.

8. In a dump-car, a car-body provided with two bottom hoppers disposed on opposite sides of a common vertical plane, the discharge openings of the hoppers facing said plane, the edges of the openings lying in planes disposed at an angle to the vertical plane and intersecting in said plane, a vertically reciprocating member mounted below the line of intersection of the inclined planes of the edges of the discharge openings, a push casting carried by the reciprocating member, hinge-pins relatively movable to one another mounted in the push casting, a tension spring interposed between the hinge pins, hinged dump doors mounted to close the discharge openings of the hoppers, toggle-links leading from the doors and coupled to the hinge pins on the push casting, and means for actuating the reciprocating member.

9. In a dump-car, a car-body provided with two bottom hoppers disposed on opposite sides of a common vertical plane, the discharge openings of the hoppers facing said plane, the edges of the openings lying in planes disposed at an angle to the vertical plane and inclined upwardly toward said plane, a vertically reciprocating member mounted between the discharge openings of the hoppers, a push casting carried by the reciprocating member, hinge pins relatively movable to one another mounted in the push casting, a tension spring interposed between the pins, means on the push-casting for setting the distance between the centers of the pins, hinged dump doors mounted to close the discharge openings of the hoppers, toggle links leading from the doors to the adjacent hinge pins on the push casting, and means for actuating the reciprocating member.

10. In a dump-car, a car-body provided with two hoppers discharging into a space between the hoppers, hinged doors normally closing the discharge openings of the hoppers and free to swing across the space aforesaid to and from the hoppers, a vertically reciprocating member mounted between the hoppers, a chambered push casting secured to the member, a movable adjustment piece in the chamber of the casting, a hinge pin secured at one end of the adjustment piece, the opposite end of the adjustment piece and the side walls of the push casting being provided with alining elongated openings or slots, a hinge pin traversing said slots, the walls of the push casting opposite the first mentioned hinge pin being provided with elongated slots to receive the adjacent ends of said hinge pin, a coiled compression spring in the push casting encircling the adjustment piece between the hinge pins, one end of the spring bearing against the second mentioned hinge-pin or that traversing the elongated slots of the adjustment piece and push casting, screws on the adjustment piece engaging the opposite end of the compression spring for adjusting the tension of the spring, a set-screw on the end of the adjustment piece traversed by the second mentioned hinge-pin for adjusting the distance of said pin from the first mentioned hinge pin, toggle links leading from the respective hinge pins to the door opposite thereto whereby the doors are caused to close or open according to the direction of movement of the reciprocating member, and means for actuating said reciprocating member.

11. In a dump-car, a car-body provided with bottom hoppers discharging into a common space beneath the body, the car-body being provided with a central charging opening from which the walls of the body flare downwardly and outwardly, and a throat on the inside of the car-body surrounding the opening and having downwardly converging walls for directing the material toward the center of the car-body and thereby effecting an even distribution thereof to the hoppers.

12. In a dump-car, a car-body provided with bottom discharge hoppers, hinged doors swinging across the space into which the material from the hoppers is discharged, a vertically reciprocating rack-bar mounted in the space aforesaid, an operating or dump shaft, a pinion on the shaft for engaging the rack-bar, the rack-bar being provided with a longitudinal groove on the side opposite the toothed face of the bar, a fixed support for the rack-bar, a stop-piece on the support traversing the groove aforesaid for limiting the movement of the rack-bar in one direction, a rock-shaft disposed adjacent and parallel to the dump shaft, a dog on the rock-shaft, a lever for operating the rock-shaft, a notched lock-disk on the dump-shaft coöperating with the dog on the rock-shaft for locking the dump-shaft against rotation in one direction and thereby locking the rack-bar against movement in a direction opposite to that in which its movement is arrested by the stop-piece, and link connections between the rack-bar and doors for actuating the latter.

13. In a dump-car, a car-body provided with a bottom hopper having a discharge opening bounded by edges disposed in a plane inclined to the vertical, freely suspended links on the car-body positioned above the discharge opening, a dump-door hinged to said links and free to swing to and from the discharge opening, a vertically reciprocating member mounted opposite the door, means for actuating said member, and toggle links hinged to the door and yieldingly coupled to the reciprocating member aforesaid.

14. In a dump-car, a car-body provided with two bottom hoppers disposed on opposite sides of a central vertical plane through the body, the discharge openings of the hoppers facing said plane and with the edges of the openings disposed in intersecting planes inclined upwardly toward said vertical plane, a vertically reciprocating member mounted to operate along said central plane below the line of intersection of the inclined planes aforesaid, freely suspended links on the car-body mounted in proximity to each discharge opening, dump-doors hinged to said links and normally closing said discharge openings, toggle links connecting said doors to the reciprocating member, and means for actuating said member.

15. In a door-operating mechanism of the character described, a chambered reciprocating push casting having opposing walls provided with elongated alining slots disposed in pairs, an adjustment piece between the slotted walls, a hinge-pin fixed at one end of the adjustment piece and extending across the chamber of the casting and free to traverse the opposing slots of one pair, the opposite end of the adjustment piece being provided with an elongated slot between and in alinement with the second pair of slots on the push casting walls, a hinge-pin passed through the several last mentioned slots, a coiled tension spring interposed between the two hinge pins, a series of adjusting screws on the adjustment piece engaging one end of the tension spring, and a screw on the adjustment piece mounted to bear against the movable hinge pin and adjust its position relatively to and from the relatively fixed pin carried by the adjustment piece.

In testimony whereof I affix my signature, in presence of two witnesses.

ERNEST JUNGHANNS.

Witnesses:
M. A. PESTANA,
S. B. CHASE.